United States Patent [19]

Horiuchi

[11] Patent Number: 4,892,397

[45] Date of Patent: Jan. 9, 1990

[54] PHOTOGRAPHIC LENS HAVING GHOST IMAGE PREVENTED FROM APPEARING

[75] Inventor: Akihisa Horiuchi, Tokyo, Japan

[73] Assignee: Canon Kabushiki Kaisha, Tokyo, Japan

[21] Appl. No.: 301,951

[22] Filed: Jan. 26, 1989

[30] Foreign Application Priority Data

Jan. 29, 1988 [JP] Japan .................................. 63-018957

[51] Int. Cl.$^4$ .......................... G02B 15/14; G02B 9/64
[52] U.S. Cl. .................................. 350/425; 350/423; 350/427
[58] Field of Search .......................... 350/425, 423, 427

[56] References Cited

U.S. PATENT DOCUMENTS 4,770,510  9/1988  Mukaiya .............................. 350/423
4,812,024  3/1989  Mukaiya .............................. 350/427

Primary Examiner—Bruce Y. Arnold
Assistant Examiner—Rebecca D. Gass
Attorney, Agent, or Firm—Fitzpatrick, Cella, Harper & Scinto

[57] ABSTRACT

In the photographic optical system comprised of a plurality of lenses and having a filter in between the lenses, a light beam emerging from a lens on the object side of the filter is arranged to diverge to prevent the light reflected from a solid state image pickup element on a predetermined image plane from being reflected again by the filter to re-focus on the predetermined image plane.

7 Claims, 9 Drawing Sheets

PHOTOGRAPHIC LENS HAVING GHOST IMAGE PREVENTED FROM APPEARING

BACKGROUND OF THE INVENTION

1. Field of the Invention

This invention relates to zoom lenses and, more particularly, to zoom lenses having ghost and flare reduced for good optical performance suited to photographic cameras or video cameras.

2. Description of the Related Art

For the photographic cameras, video cameras, etc., zoom lenses of lage relative aperture and high range with high optical performance are demanded.

Of these, in the video camera, because its image pickup element is relatively low in sensitivity, the aperture ratio of the zoom lens is required to be as large as possible.

Besides this, in the color cameras using the single-tube type color image pickup tube or the image pickup plate such as a CCD along with the stripe filter, it is required to design the optical system as a whole in a telecentric form such that a light beam incident on the stripe filter is as normal as possible relative to the plane of the stripe filter in order to prevent mixture of colors.

Also, as, today, the CCD or MOS has been widely used as the image pickup element of the video camera, the surface of its cover glass and the surface of the image pickup element have generally high reflectance. For this reason, light reflected from these surfaces is reflected from the lens surfaces of the photographic lens or from the lens barrel, etc., and then enters the image pickup element again, so that there is a cause of producing the so-called ghost and flare.

As a technique that has a good image quality obtained from the attention to this point, there is U.S. patent application Ser. No. 223,108 filed on July 22, 1988.

In this proposal, with respect to each lens surface lying on the image plane side of the diaphragm, on the assumption that the light rays which has returned back from the image plane are reflected therefrom, the ray tracing operation is carried out, so that even if the light rays reflected from the lens surfaces form an image, the image takes its place on the photographic lens side of the predetermined image plane when bending of each lens is performed. Thus, the radius of curvature of each lens is determined to thereby remove harmful light. It should be noted that the reason why this has been done on the more rear lens surfaces than the diaphragm is that when the diaphragm is open at full aperture, because of the presence of light rays of various angles, the influence of the harmful rays becomes uniform over the entirety, being not too much conspicuous. Therefore, no problem arises on actual practice. On the other hand, when the diaphragm is stopped down, the influence gets appreciable. Hence attention is paid to that part which causes reflection of light when the diaphragm is stopped down.

By the way, as the size of aperture opening of the diaphragm nears the minimum, an appreciable diffraction phenomenon takes place due to the influence of the diaphragm blades. Hence, the image quality starts to deteriorate. Therefore, to avoid this phenomenon, an ND filter fulfills the light reducing function is put into the arrangement when the stopping down is started, thus permitting an exposure to be made with the diaphragm in a relatively wide open state.

However, the use of this filter gives rise to a new problem. That is, if this filter is positioned, for example, in a section constituting an afocal optical system, the light beam reflected from the image pickup element is reflected again by this filter to re-focus at a point near the image pickup element, thus forming ghost.

Meanwhile, as the zoom lenses suited to video cameras, mention may be made of U.S. Pat. Nos. 4,618,219, 4,621,905, 4,659,187, 4,653,874 and 4,518,228. Besides these, there are Japanese Laid-Open Patent Application No. Sho 59-222807, Japanese Laid-Open Patent Application No. Sho 60-260912, Japanese Laid-Open Patent Application No. Sho 61-20291, and U.S. patent application Ser. No. 190,472 filed on May 5, 1988, now U.S. Pat. No. 4,812,024.

SUMMARY OF THE INVENTION

A first object of the invention is to provide a photographic lens which enables an image of good quality to obtain.

A second object of the invention is to provide a photographic lens which has ghost, or flare reduced.

A third object of the invention is to provide a zoom lens suited to video cameras using the solid state image pickup element.

To attain these objects, the zoom lens according to the invention comprises, from front to rear, a first lens unit having a positive refractive power, a second lens unit having a negative refractive power for variation of the image magnification, a third lens unit for compensating for the shift of an image plane when the image magnification varies, a fourth lens unit, and a fifth lens unit having a positive refractive power and an image forming function, and is made to satisfy the following condition:

$$1.05 < f_4/L < 1.3 \qquad (a)$$

where $f_4$ is a focal length of the fourth lens unit, and L is the absolute value of a distance from a point of convergence of an on-axial light beam which has passed the first lens unit through the third lens unit to a front principal point of the fourth lens unit.

BRIEF DESCRIPTION OF THE DRAWINGS

FIGS. 2(A), 2(B) and 2(C) to FIGS. 6(A), 6(B) and 6(C) are aberration curves of numerical examples 1 to 5 of the invention, respectively. In the graphs for aberrations, FIGS. 2(A), 3(A), 4(A), 5(A) and 6(A) show the aberrations in the wide angle end, FIGS. 2(B), 3(B), 4(B), 5(B) and 6(B) in the middle position, and FIGS. 2(C), 3(C), 4(C), 5(C) and 6(C) in the telephoto end.

Figure 1:
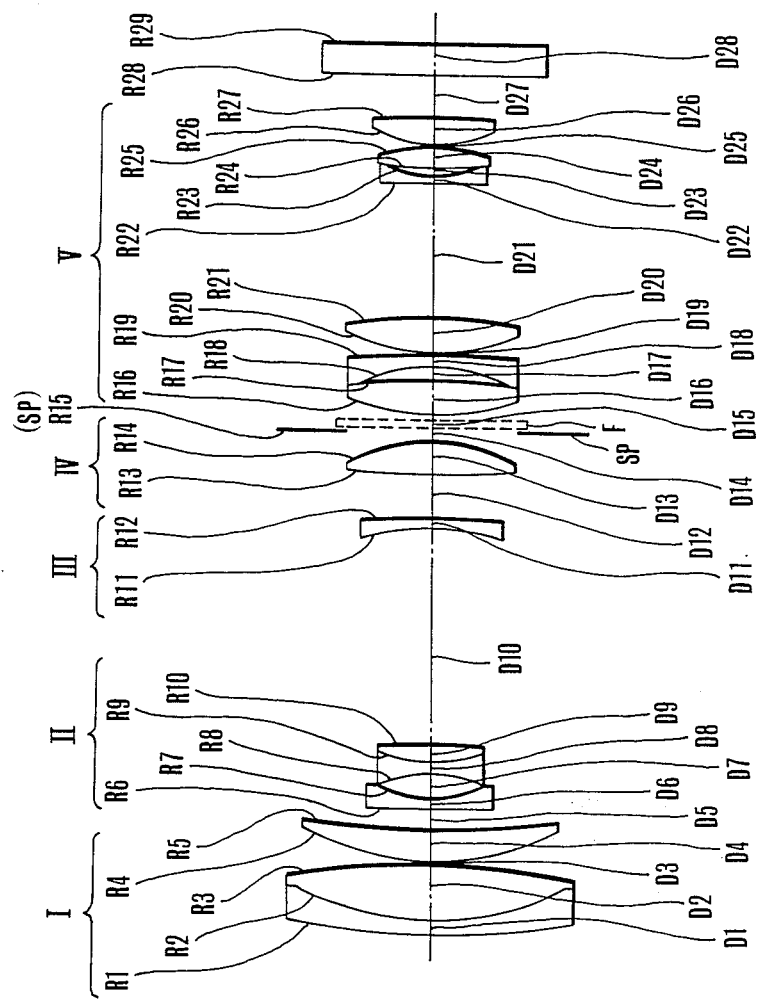
FIG. 1 is a lens block diagram of a numerical example 1 of the invention.
Figure 2A:
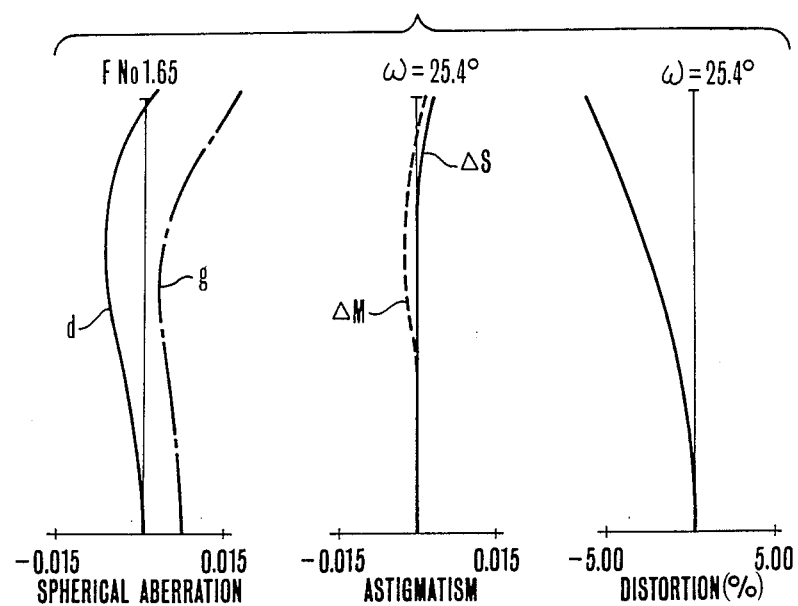
Figure 2B:
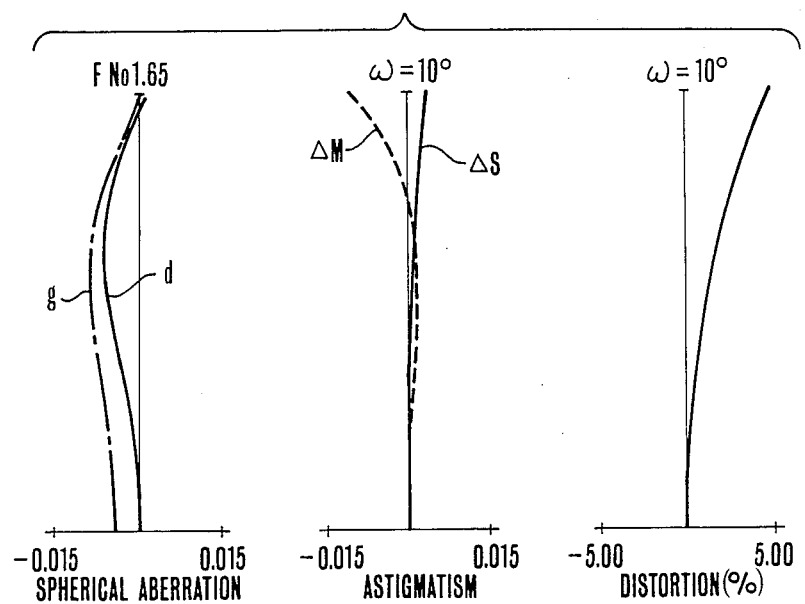
Figure 2C:
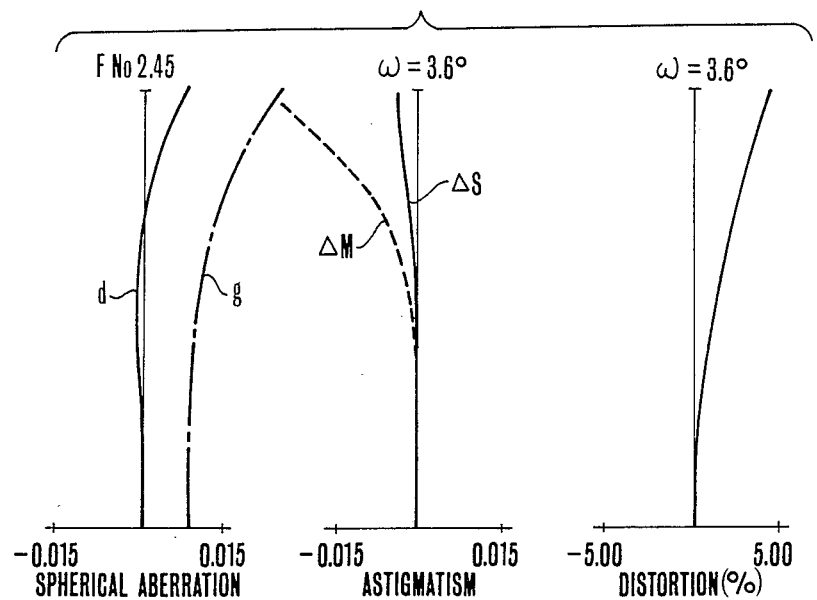

In the drawings, I, II, III, IV, V are respectively the first, second, third, fourth and fifth lens units. ΔM is the meridional image surface, ΔS is the sagittal image surface, d is the d-line, g is the g-line, and SP is the aperture stop.

DETAILED DESCRIPTION OF THE PREFERRED EMBODIMENTS

FIG. 1 is a longitudinal section view of an example of a specific lens of the invention, comprising a first lens unit I for focusing having a positive refractive power, a second lens unit II axially, monotonously movable for variation of the image magnification and having a negative refractive power, a third lens unit III axially movable to a locus convex toward the object side for compensating for the shift of an image plane as the image magnification varies and having a negative refractive power, a fourth lens unit IV receptive of the light beam from the third lens unit III for producing an almost diverging light beam and having a positive refractive power, and a fixed fifth lens unit V having the image forming function. SP represents a fixed aperture stop. F represents an ND filter, which is insserted into the lens system at a position adjacent to the aperture stop SP at the time of the stopped-down of the aperture stop SP.

The fifth lens unit V includes, from front to rear, a first bi-convex lens, a second lens having a negative refractive power and having a concave surface facing the object side, a third bi-convex lens having a refracting surface of stronger curvature facing the abject side, a fourth lens having a negative refractive power and having a concave surface facing the image plane side, a fifth bi-convex lens having a refracting surface of stronger curvature facing the image plane side, and a sixth bi-convex lens having a refracting surface of stronger curvature facing the object side. Incidentally, the term "a refracting surface of stronger curvature facing the image plane side" indicates that it is compared with the refractive power of the other surface, i.e., the lens surface facing the object side. The term "a refracting surface of stronger curvature facing the object side" indicates the same.

In this embodiment, in such a zoom type, by specifying the lens structure of the fifth lens unit as above, the aberrations resulting from the increase of the aperture ratio and the increase of the zoom ratio are well corrected to obtain good optical performance over the entire zooming range.

Particularly the residual aberrations of the zoom section, for example, the spherical aberration and coma, are corrected in good balance while still achieving a shortening of the total length of the lens.

Also, by specifying the refractive power of the fourth lens unit as represented by the inequalities of condition (a), in other words, by making a slightly divergent tendency of the light beam emerging from the fourth lens unit, when the ND filter F is disposed adjacent to the aperture step SP, the light reflected from the surface of the image picku element is prevented from being reflected from this filter and from entering again the surface of the image pickup element, so that the ghost, flare, etc. are advantageously prevented from appearing thereon.

When the lower limit of the inequalities of condition (a) is exceeded, the light beam becomes a parallel light, causing effective removal of ghost and flare to get difficult. Also, when the upper limit is exceeded, the light beam gets too much divergent. This leads to an increase in the variation of aberrations objectionably.

Also, in this embodiment, to minimize the variation of aberrations with zooming and obtain high optical performance over the entire area of the picture frame, it is proper to specify the constructions of the elements of the first lens unit and the second lens unit as follows:

The aforesaid first lens unit includes a first meniscus lens having a negative refractive power and having a convex surface facing the object side, a second bi-convex lens, and a third meniscus lens having a positive refractive power and having a convex surface facing the object side. The second lens unit has a first lens having a negative refractive power, a second bi-concave lens and a third lens having a positive refractive power, the second lens and the third lens being cemented together. Where the refractive index of a medium of the j-th lens in the i-th lens unit is represented by $N_{i,j}$, the radius of curvature of the j-th lens surface of the i-th lens unit by $R_{i,j}$, and the shortest focal length of the entire lens system by fw, the following conditions are satisfied:

$$1.57 < N_{1,2} + N_{1,3}/2 \quad (1)$$

$$0.96 < |f_2/f_w| < 1.09, f_2 < 0 \quad (2)$$

$$1.18 < R_{2,2}/f_w < 1.35 \quad (3)$$

$$0.77 < |R_{2,2}/R_{2,3}| < 0.87 \quad (4)$$

Next, the technical significance of each of the above-described inequalities of conditions (1) to (4) is explained.

The inequality of condition (1) concerns with the refractive indices of the media of the two positive lenses of the first lens unit and has a main aim to achieve a minimization of the size and weight of the whole lens system. In general, as to one of the means for shortening the total length of the lens, there is the method of decreasing the focal length of the second lens unit. However, if the focal length of the second lens unit is decreased, the focal length of the first lens unit, too, has to be decreased. For this reason, when glasses of the combined lower refractive index than the lower limit of the inequality of condition (1) are used in the two positive lenses of the first lens unit, the curvatures of the lenses get tougher so that the edge thicknesses of the constituent lenses come to be insufficient. Also, to compensate for this, the axial length thickness becomes thicker. The increase of the axial lens thickness causes the principal point position of the lens to enter the inside of the lens surface. Therefore, the space between the first lens unit and the second lens unit in the wide angle end becomes insufficient, so that the minimization of the size becomes difficult to achieve. Further, the Petzval sum becomes liable to increase in the positive direction. Particularly in the wide angle end, the image plane in the sagittal direction at an intermediate angle becomes under-corrected. Good correction of this becomes difficult.

The inequalities of condition (2) concerns with the focal length of the second lens unit and, similarly to the inequalities of condition (1), have aims to minimize the size and weight of the whole lens system and to maintain good curvature of field. When the lower limit is exceeded, though it is advantageous for the minimization of the size of the whole lens system, the Petzval sum is increased in the negative direction, and over-correction of the field curvature results. Also, the coma is increased objectionably. Also, the variation of aberrations at the time of zooming becomes large. When the upper limit is exceeded, the zooming movement of the second lens unit becomes large, and the minimization of the size becomes difficult to achieve.

The inequalities of condition (3) concern with the radius of curvature of the second lens surface counting from the front in the second lens unit and is in relation to the condition (2) too. When the curvature is small beyond the lower limit, the outward coma comes to be large. Hence, it is no good. Also, when the curvature is large beyond the upper limit, the Petzval sum is increased in the positive direction, and under-correction of the field curvature results. The total length of the lens also comes to increase. Hence it is no good.

The inequalities of condition (4) concern with the ratio of the radius of curvature of the second lens surface counting from the front and the radius of curvature of the third lens surface in the second lens unit, and have main aims to minimize the variation of distortion, spherical aberration and coma at the time of zooming so that the aberrations are corrected in good balance and to achieve a minimization of the size and weight of the whole lens system. When the lower limit is exceeded, the variation of spherical aberration becomes large. Also, when the upper limit is exceeded, the variation of coma becomes large, and good correction of this becomes difficult.

In this embodiment, to advantageously prevent ghost and flare due to the light reflected from the surface of the image pickup element, the lens design of the fifth lens unit is preferably set as follows:

That is, to express it in a general form, the refractive index of the medium of the j-th lens in the i-th lens unit is represented by Ni,j, the radius of curvature of the j-th lens surface of the i-th lens unit by Ri,j, and the shortest focal length of the entire lens system by fw. Then, the following conditions are satisfied:

$$27.8 < |R5,4/fw| < 38.5 \tag{5}$$

$$-0.041 < fw/R5,7 < 0.034 \tag{6}$$

$$1.73 < N5,2 + N5,4/2 \tag{7}$$

The inequalities of condition (5) concern with the radius of curvature of the fourth lens surface counting from the front in the fifth lens unit and have a main aim to lessen production of coma. Another main aim is that the reflected light between the image pickup element and the above-identified lens surface, which becomes the cause of a harmful light such as ghost, flare, etc. is re-focused in a position on the photographic lens side. When the curvature becomes small beyond the lower limit, inward coma is produced. This is difficult to correct by another lens surface. When the curvature becomes large beyond the upper limit, the re-focus position of the reflected light between the image pickup element and the lens surface comes near the image plane of the photograpic lens or takes a farther place of the photographic lens than the image plane, thus becoming the harmful light. Hence it is no good.

The inequalities of condition (6) have similar aims to that of the inequalities of condition (5) to bring the re-focus position of the reflected light between the image pickup element and the above-identified lens surface into the photographic lens side. Another aim is to correct field curvature and coma in good balance. When the curvature becomes small beyond the upper limiter, large outward coma is produced. Also, when the curvature becomes large beyond the lower limit, the field curvature gets under-corrected. Hence it is no good.

The inequality of condition (7) concerns with the refractive indices of the media of the two negative lenses in the fifth lens unit and is to maintain good field curvature under the conditions (5) and (6). When the refractive indices of the media of the negative lenses become small beyond the lower limit, the Petzval sum increases in the negative direction and the field curvature gets over-corrected. Hence it is no good.

It should be noted that, in this embodiment, to obtain a further improvement of the optical performance over the entire zooming range, for the design of the fifth lens unit, it is good to set forth the following features. That is, letting the j-th lens thickness or air space of the i-th lens unit be denoted by Di,j, the following conditions are satisfied:

$$-1.97 < R5,1/R5,3 < -1.28 \tag{8}$$

$$2.22 < R5,5/fw < 2.69 \tag{9}$$

$$1.35 < R5,8/fw < 1.55 \tag{10}$$

$$3.36 < R5,9/R5,11 < 4.62 \tag{11}$$

$$0.15 < D5,2/fw < 0.24 \tag{12}$$

$$1.28 < D5,6/fw < 1.53 \tag{13}$$

$$0.11 < D5,8/fw < 0.15 \tag{14}$$

The inequalities of condition (8) concern with the ratio of the radius of curvature of the first lens surface counting from the front and the radius of curvature of the third lens surface in the fifth lens unit, and are mainly to properly correct spherical aberration. When the lower limit is exceeded, the spherical aberration gets under-corrected. Also, when the upper limit is exceeded, it gets over-corrected.

The inequalities of condition (9) are to converge the light beam with good efficiency without producing spherical aberration as far as possible. When the lower limit is exceeded, very large spherical aberration is produced. Also, when the upper limit is exceeded, the beam converging effect becomes insufficient and an increase of the total length of the lens results. Hence it is no good.

The inequalities of condition (10) are a good assistance in constructing a telecentric optical system in a compact form over the entirety of the lens system without causing coma to produce as far as possible. When the lower limit is exceeded, very large outward coma is produced, which is difficult to correct well. Also, when a telecentric optical system is too much achieved beyond the upper limit, the total length of the lens is increased objectionably.

The inequalities of condition (11) are to correct curvature of field and coma in good balance. When the lower limit is exceeded, the curvature of field gets under-corrected, and moreover large inward coma is produced. Also, when the upper limit is exceeded, the curvature of field gets over-corrected and moreover large outward coma is produced, which is difficult to correct well.

The inequalities of condition (12) are mainly to correct spherical aberration and astigmatism in good balance. When the lower limit is exceeded, the astigmatism increases. Also, when the higher limit is exceeded, higher order spherical aberrations are produced.

The inequalities of condition (13) concern with the interval between the first lens and the second lens in the fifth lens unit, and are to correct both of longitudinal aberrations and lateral aberrations in good balance and to achieve a telecentric optical system. When the lower limit is exceeded, the lateral aberrations such as astigmatism and coma deteriorate, and the telecentric optical system becomes difficult to achieve. Also, when the upper limit is exceeded, the longitudinal aberrations such as spherical aberration is produced.

The inequalities of condition (14) are mainly to correct coma and distortion. When the lower limit is exceeded, outward coma is produced, which is difficult to correct well. Also when the lower limit is exceeded, large barrel type distortion comes to be produced. Here it is no good.

Next, numerical examples 1 to 5 of the invention are shown. In the numerical examples 1 to 5, Ri is the radius of curvature of the i-th lens surface counting from the object side, Di is the i-th lens thickness and air separation counting from the object side, and Ni and νi are respectively the refractive index and Abbe number of the glass of the i-th lens counting from the object side. R28 and R29 represent a face plate, a filter, or the like.

Also, the relationship of the above-described various inequalities of conditions (1) to (14) with the various numerical values in the numerical examples 1 to 5 is shown in Table-1.

Numerical Example 1 (FIGS. 1, 2(A), 2(B) and 2(C)):

| F = 1– 7.6 | FNo = 1:1.6-2.4 | 2ω = 50.8°-7.1° | |
|---|---|---|---|
| R1 = 10.79 | D1 = 0.16 | N1 = 1.80518 | ν1 = 25.4 |
| R2 = 3.70 | D2 = 0.60 | N2 = 1.60311 | ν2 = 60.7 |
| R3 = −9.15 | D3 = 0.02 | | |
| R4 = 3.01 | D4 = 0.34 | N3 = 1.69680 | ν3 = 55.5 |
| R5 = 8.14 | D5 = Variable | | |
| R6 = 17.97 | D6 = 0.08 | N4 = 1.77250 | ν4 = 49.6 |
| R7 = 1.24 | D7 = 0.33 | | |
| R8 = −1.52 | D8 = 0.08 | N5 = 1.69680 | ν5 = 55.5 |
| R9 = 1.52 | D9 = 0.22 | N6 = 1.84666 | ν6 = 23.9 |
| R10 = −41.16 | D10 = Variable | | |
| R11 = −2.61 | D11 = 0.09 | N7 = 1.69680 | ν7 = 55.5 |
| R12 = −24.21 | D12 = Variable | | |
| R13 = 12.52 | D13 = 0.39 | N8 = 1.60311 | ν8 = 60.7 |
| R14 = −2.05 | D14 = 0.08 | | |
| R15 = Stop | D15 = 0.17 | | |
| R16 = 3.01 | D16 = 0.37 | N9 = 1.60311 | ν9 = 60.7 |
| R17 = −6.62 | D17 = 0.16 | | |
| R18 = −2.16 | D18 = 0.12 | N10 = 1.80518 | ν10 = 25.4 |
| R19 = −36.61 | D19 = 0.01 | | |
| R20 = 2.50 | D20 = 0.42 | N11 = 1.58267 | ν11 = 46.4 |
| R21 = −5.60 | D21 = 1.40 | | |
| R22 = 290.77 | D22 = 0.08 | N12 = 1.83400 | ν12 = 37.2 |
| R23 = 1.44 | D23 = 0.12 | | |
| R24 = 6.47 | D24 = 0.20 | N13 = 1.49831 | ν13 = 65.0 |
| R25 = −2.51 | D25 = 0.01 | | |
| R26 = 1.52 | D26 = 0.31 | N14 = 1.56384 | ν14 = 60.7 |
| R27 = −11.50 | D27 = 0.42 | | |
| R28 = ∞ | D28 = 0.32 | N15 = 1.51633 | ν15 = 64.1 |
| R29 = ∞ | | | |
| f | 1.00 | 2.70 | 7.60 |
| D 5 | 0.11 | 1.58 | 2.43 |
| D10 | 2.45 | 0.58 | 0.33 |
| D12 | 0.29 | 0.69 | 0.09 |

Figure 3A:
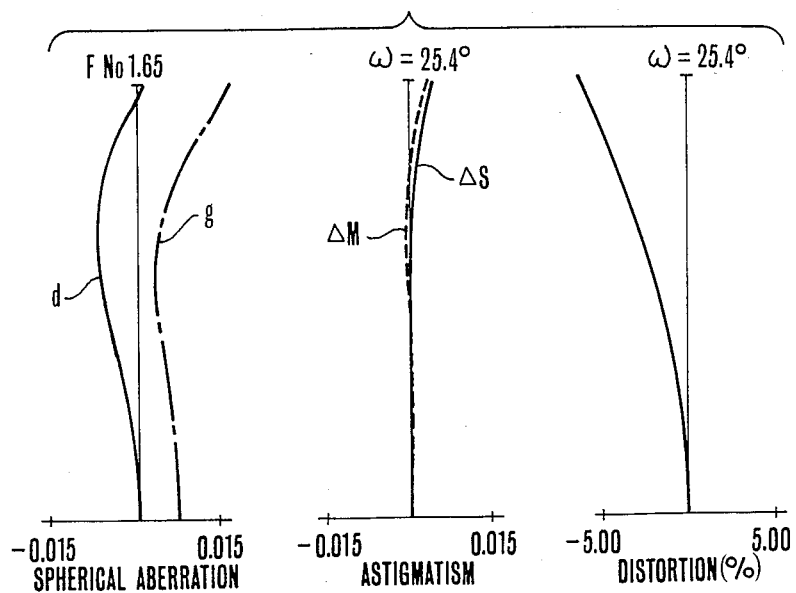
Figure 3B:
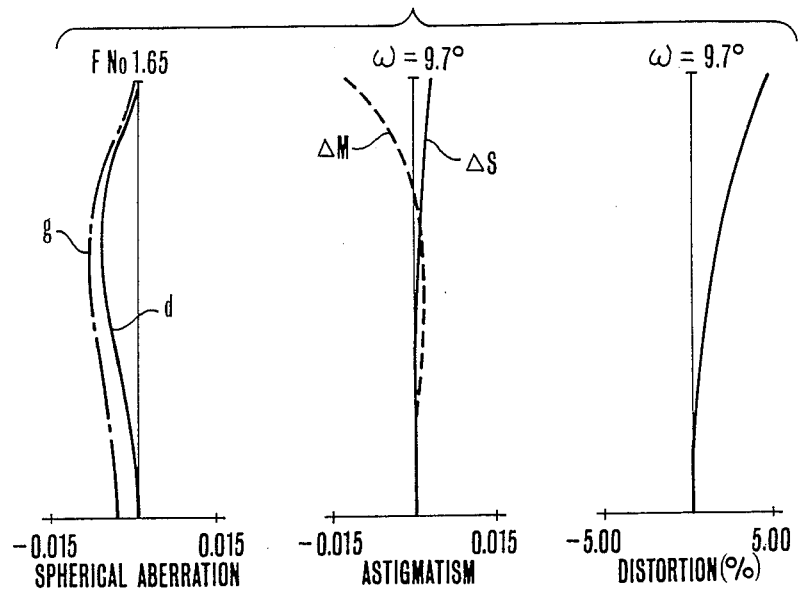
Figure 3C:
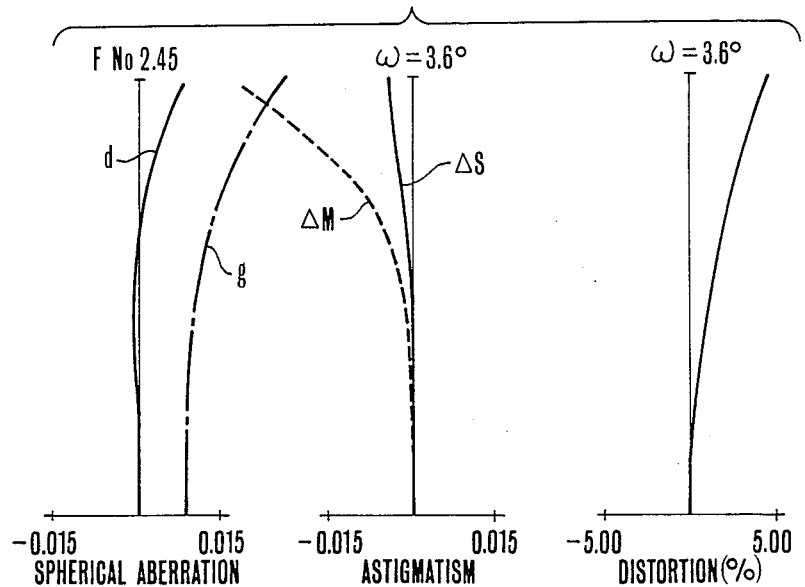

Numerical Example 2 (FIGS. 3(A), 3(B) and 3(C)):

| F = 1–7.6 | FNo = 1:1.6-2.4 | 2ω = 50.8°-7.1° | |
|---|---|---|---|
| R1 = 10.41 | D1 = 0.16 | N1 = 1.80518 | ν1 = 25.4 |
| R2 = 3.65 | D2 = 0.60 | N2 = 1.60311 | ν2 = 60.7 |
| R3 = −9.35 | D3 = 0.01 | | |
| R4 = 3.02 | D4 = 0.34 | N3 = 1.69680 | ν3 = 55.5 |
| R5 = 8.56 | D5 = Variable | | |
| R6 = 15.40 | D6 = 0.08 | N4 = 1.77250 | ν4 = 49.6 |
| R7 = 1.24 | D7 = 0.33 | | |
| R8 = −1.51 | D8 = 0.08 | N5 = 1.68680 | ν5 = 55.5 |
| R9 = 1.51 | D9 = 0.22 | N6 = 1.84666 | ν6 = 23.9 |
| R10 = −115.30 | D10 = Variable | | |
| R11 = −2.56 | D11 = 0.09 | N7 = 1.69680 | ν7 = 55.5 |
| R12 = −22.89 | D12 = Variable | | |
| R13 = 12.62 | D13 = 0.41 | N8 = 1.60311 | ν8 = 60.7 |
| R14 = −2.02 | D14 = 0.08 | | |
| R15 = Stop | D15 = 0.17 | | |
| R16 = 2.98 | D16 = 0.36 | N9 = 1.60311 | ν9 = 60.7 |
| R17 = −7.46 | D17 = 0.17 | | |
| R18 = −2.15 | D18 = 0.12 | N10 = 1.80518 | ν10 = 25.4 |
| R19 = −29.28 | D19 = 0.01 | | |
| R20 = 2.54 | D20 = 0.42 | N11 = 1.58267 | ν11 = 46.4 |
| R21 = −5.48 | D21 = 1.45 | | |
| R22 = −58.40 | D22 = 0.08 | N12 = 1.83400 | ν12 = 37.2 |
| R23 = 1.44 | D23 = 0.12 | | |
| R24 = 6.35 | D24 = 0.21 | N13 = 1.49831 | ν13 = 65.0 |
| R25 = −2.54 | D25 = 0.01 | | |
| R26 = 1.52 | D26 = 0.32 | N14 = 1.56384 | ν14 = 60.7 |
| R27 = −7.76 | D27 = 0.42 | | |
| R28 = ∞ | D28 = 0.34 | N15 = 1.51633 | ν15 = 64.1 |
| R29 = ∞ | | | |
| f | 1.00 | 2.76 | 7.60 |
| D5 | 0.12 | 1.59 | 2.40 |
| D10 | 2.43 | 0.56 | 0.34 |
| D12 | 0.28 | 0.68 | 0.09 |

Figure 4A:
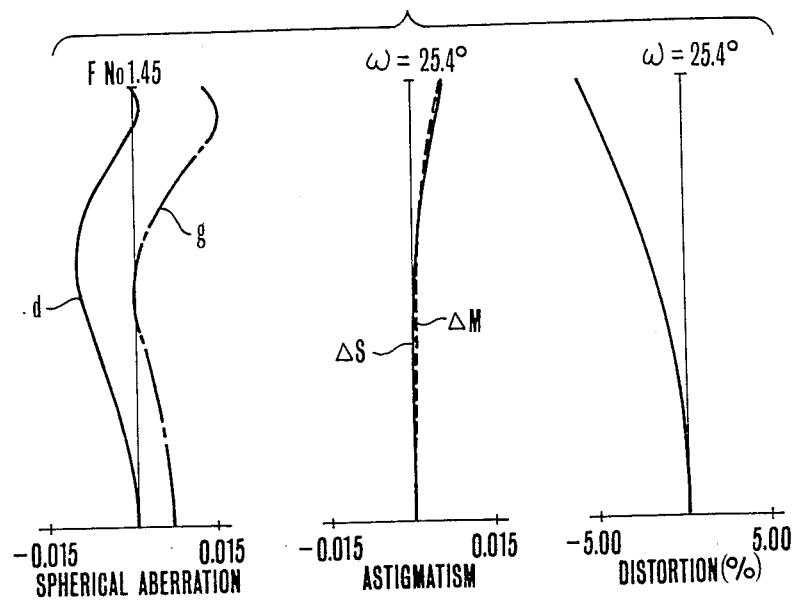
Figure 4B:
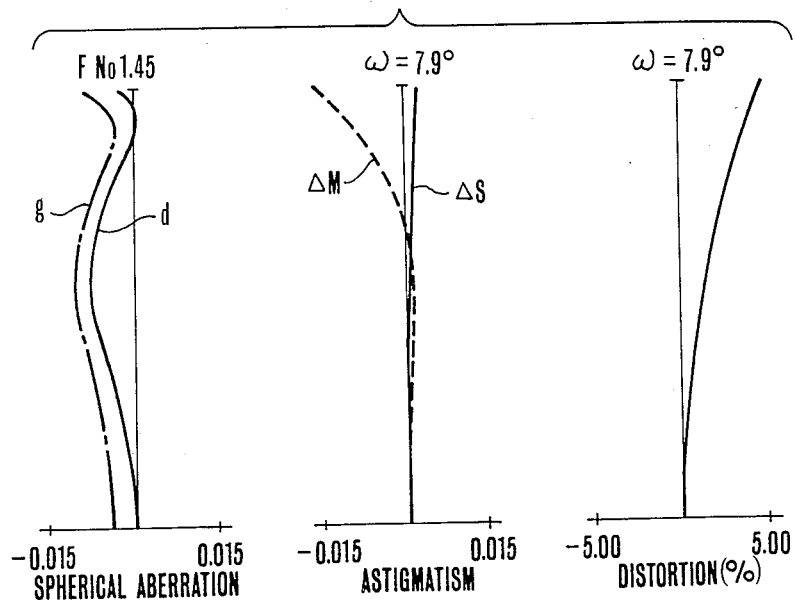
Figure 4C:
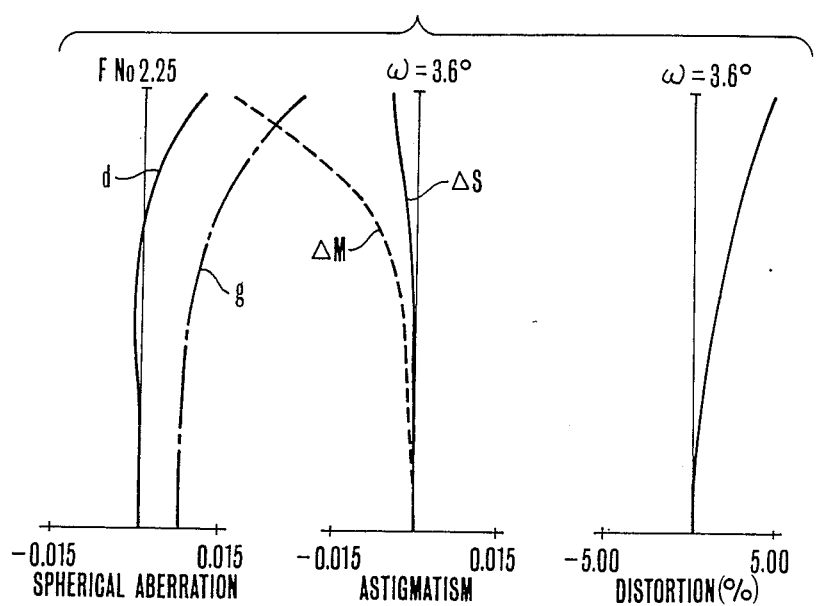

Numerical Example 3 (FIGS. 4(A), 4(B) and 4(C)):

| F = 1–7.6 | FNo = 1:1.4-–2.2 | 2ω = 50.8°-7.1° | |
|---|---|---|---|
| R1 = 10.18 | D1 = 0.16 | N1 = 1.80518 | ν1 = 25.4 |
| R2 = 3.70 | D2 = 0.66 | N2 = 1.60311 | ν2 = 60.7 |
| R3 = −9.65 | D3 = 0.01 | | |
| R4 = 3.08 | D4 = 0.39 | N3 = 1.69680 | ν3 = 55.5 |
| R5 = 8.62 | D5 = Variable | | |
| R6 = 13.66 | D6 = 0.08 | N4 = 1.77250 | ν4 = 49.6 |
| R7 = 1.26 | D7 = 0.35 | | |
| R8 = −1.52 | D8 = 0.07 | N5 = 1.69680 | ν5 = 55.5 |
| R9 = 1.52 | D9 = 0.24 | N6 = 1.84666 | ν6 = 23.9 |
| R10 = 134.86 | D10 = Variable | | |
| R11 = −2.55 | D11 = 0.10 | N7 = 1.69680 | ν7 = 55.5 |
| R12 = −21.72 | D12 = Variable | | |
| R13 = 11.34 | D13 = 0.49 | N8 = 1.60311 | ν8 = 60.7 |
| R14 = −2.07 | D14 = 0.08 | | |
| R15 = Stop | D15 = 0.17 | | |
| R16 = 2.90 | D16 = 0.44 | N9 = 1.60311 | ν9 = 60.7 |
| R17 = −8.50 | D17 = 0.23 | | |
| R18 = −2.14 | D18 = 0.13 | N10 = 1.80518 | ν10 = 25.4 |
| R19 = −31.91 | D19 = 0.01 | | |
| R20 = 2.55 | D20 = 0.52 | N11 = 1.58267 | ν11 = 46.4 |
| R21 = −5.29 | D21 = 1.37 | | |
| R22 = −25.78 | D22 = 0.08 | N12 = 1.83400 | ν12 = 37.2 |
| R23 = 1.46 | D23 = 0.14 | | |
| R24 = 6.49 | D24 = 0.25 | N13 = 1.49831 | ν13 = 65.0 |
| R25 = −2.36 | D25 = 0.01 | | |
| R26 = 1.52 | D26 = 0.38 | N14 = 1.56384 | ν14 = 60.7 |
| R27 = −8.25 | D27 = 0.42 | | |
| R28 = ∞ | D28 = 0.34 | N15 = 1.51633 | ν15 = 64.1 |
| R29 = ∞ | | | |
| f | 1.00 | 3.41 | 7.60 |
| D 5 | 0.11 | 1.79 | 2.39 |
| D10 | 2.44 | 0.37 | 0.36 |
| D12 | 0.27 | 0.66 | 0.08 |

Figure 5A:
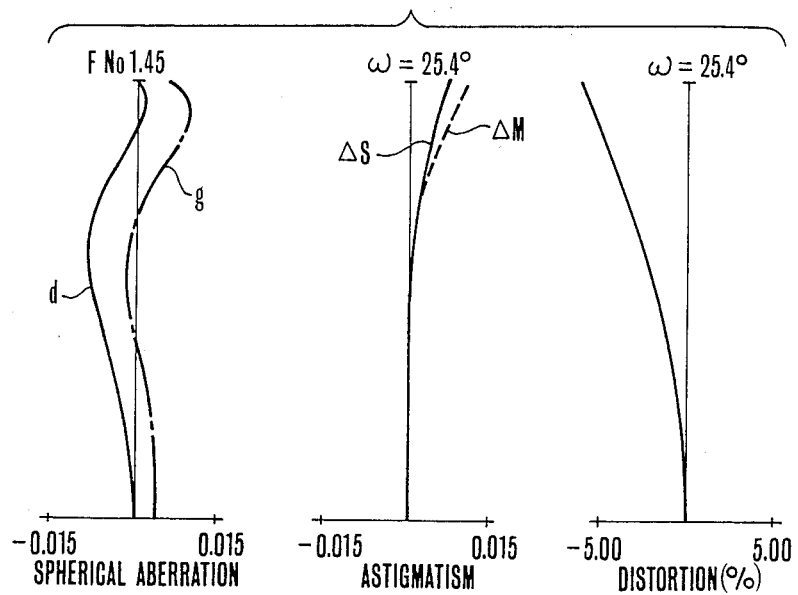
Figure 5B:
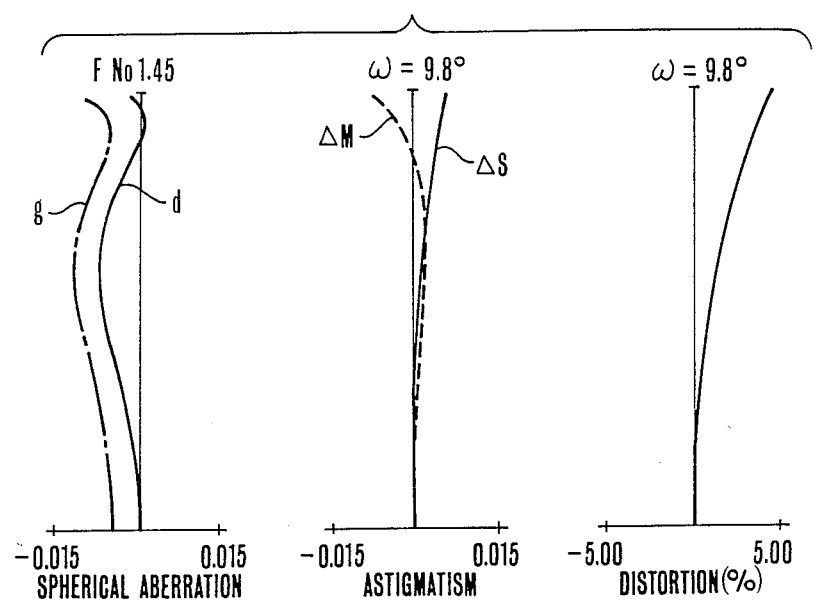
Figure 5C:
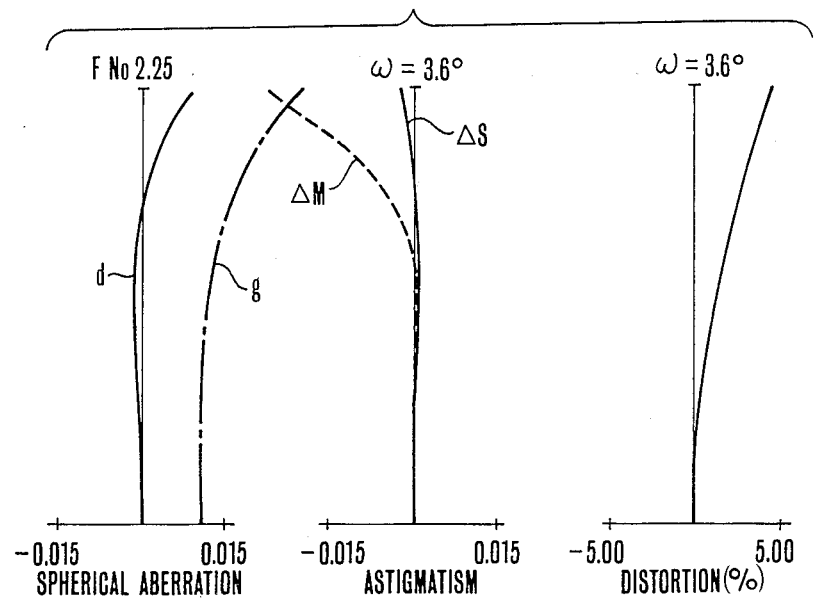

Numerical Example 4 (FIGS. 5(A), 5(B) and 5(C)):

| F = 1-7.6 | FNo = 1:1.4-2.2 | 2ω = 50.8°-7.1° | |
|---|---|---|---|
| R1 = 10.92 | D1 = 0.16 | N1 = 1.80518 | ν1 = 25.4 |
| R2 = 3.73 | D2 = 0.66 | N2 = 1.60311 | ν2 = 60.7 |
| R3 = −9.55 | D3 = 0.01 | | |
| R4 = 3.07 | D4 = 0.40 | N3 = 1.69680 | ν3 = 55.5 |
| R5 = 8.98 | D5 = Variable | | |
| R6 = 18.55 | D6 = 0.08 | N4 = 1.77250 | ν4 = 49.6 |
| R7 = 1.26 | D7 = 0.34 | | |
| R8 = −1.54 | D8 = 0.07 | N5 = 1.69680 | ν5 = 55.5 |
| R9 = 1.54 | D9 = 0.23 | N6 = 1.84666 | ν6 = 23.9 |
| R10 = −5622.78 | D10 = Variable | | |
| R11 = −2.58 | D11 = 0.10 | N7 = 1.69680 | ν7 = 55.5 |
| R12 = −23.59 | D12 = Variable | | |
| R13 = 12.41 | D13 = 0.46 | N8 = 1.63854 | ν8 = 55.4 |
| R14 = −2.25 | D14 = 0.08 | | |
| R15 = Stop | D15 = 0.17 | | |

-continued

| F = 1-7.6 | FNo = 1:1.4-2.2 | 2ω = 50.8°-7.1° | |
|---|---|---|---|
| R16 = 3.94 | D16 = 0.49 | N9 = 1.60311 | ν9 = 60.7 |
| R17 = −3.94 | D17 = 0.15 | | |
| R18 = −2.13 | D18 = 0.13 | N10 = 1.80518 | ν10 = 25.4 |
| R19 = −31.57 | D19 = 0.01 | | |
| R20 = 2.41 | D20 = 0.52 | N11 = 1.58267 | ν11 = 46.4 |
| R21 = −7.10 | D21 = 1.44 | | |
| R22 = 31.28 | D22 = 0.08 | N12 = 1.83400 | ν12 = 37.2 |
| R23 = 1.44 | D23 = 0.14 | | |
| R24 = 5.83 | D24 = 0.24 | N13 = 1.49831 | ν13 = 65.0 |
| R25 = −2.72 | D25 = 0.01 | | |
| R26 = 1.52 | D26 = 0.34 | N14 = 1.56384 | ν14 = 60.7 |
| R27 = −12.89 | D27 = 0.42 | | |
| R28 = ∞ | D28 = 0.34 | N15 = 1.51633 | ν15 = 64.1 |
| R29 = ∞ | | | |
| f | 1.00 | 2.76 | 7.60 |
| D5 | 0.13 | 1.60 | 2.40 |
| D10 | 2.45 | 0.58 | 0.37 |
| D12 | 0.28 | 0.67 | 0.08 |

Figure 6A:
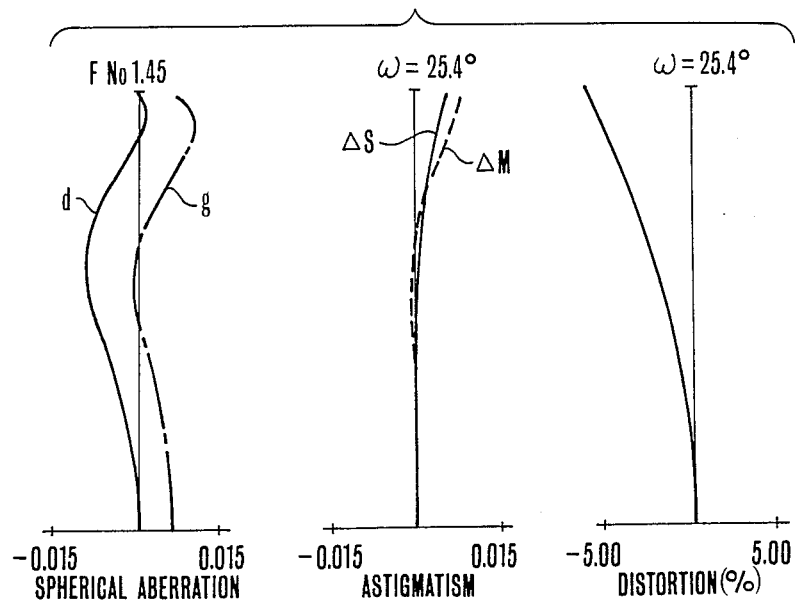
Figure 6B:
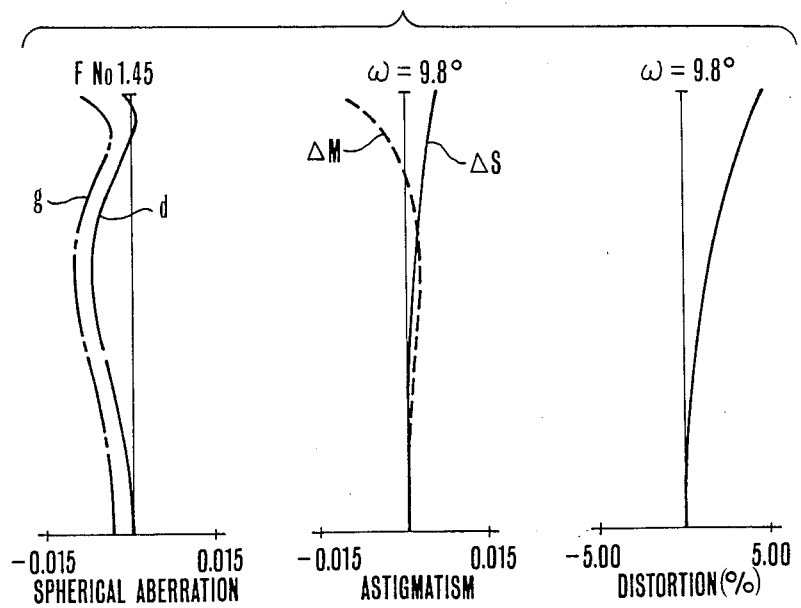
Figure 6C:
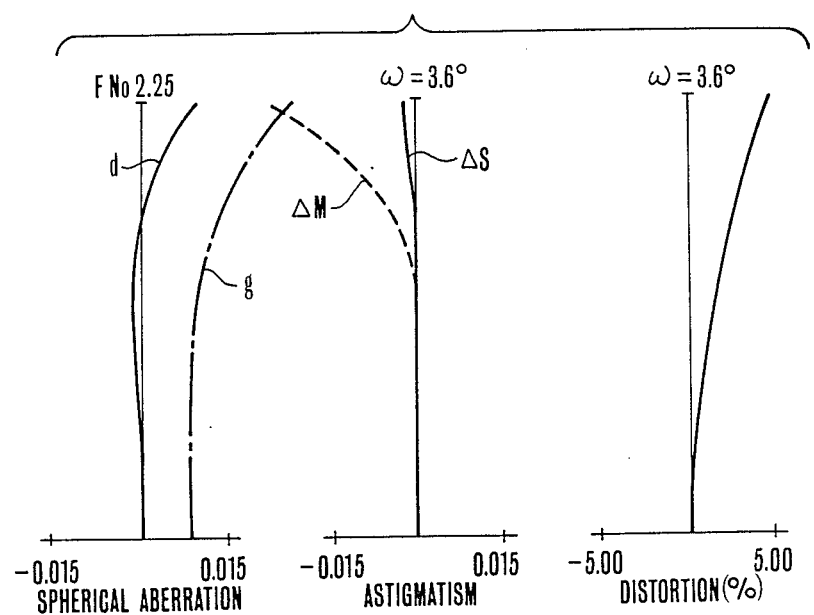

Numerical Example 5 (FIGS. 6(A), 6(B) and 6(C)):

| F = 1-7.6 | FNo = 1:1.4-2.2 | 2ω = 50.8°-7.1° | |
|---|---|---|---|
| R1 = 10.54 | D1 = 0.16 | N1 = 1.80518 | ν1 = 25.4 |
| R2 = 3.75 | D2 = 0.66 | N2 = 1.60311 | ν2 = 60.7 |
| R3 = −9.54 | D3 = 0.01 | | |
| R4 = 3.05 | D4 = 0.39 | N3 = 1.69680 | ν3 = 55.5 |
| R5 = 8.52 | D5 = Variable | | |
| R6 = 15.52 | D6 = 0.08 | N4 = 1.77250 | ν4 = 49.6 |
| R7 = 1.28 | D7 = 0.34 | | |
| R8 = −1.55 | D8 = 0.07 | N5 = 1.69680 | ν5 = 55.5 |
| R9 = 1.55 | D9 = 0.23 | N6 = 1.84666 | ν6 = 23.9 |
| R10 = 61.61 | D10 = Variable | | |
| R11 = −2.57 | D11 = 0.10 | N7 = 1.69680 | ν7 = 55.5 |
| R12 = −23.46 | D12 = Variable | | |
| R13 = 11.39 | D13 = 0.47 | N8 = 1.63854 | ν8 = 55.4 |
| R14 = −2.22 | D14 = 0.08 | | |
| R15 = Stop | D15 = 0.17 | | |
| R16 = 3.93 | D16 = 0.49 | N9 = 1.60311 | ν9 = 60.7 |
| R17 = −3.93 | D17 = 0.16 | | |
| R18 = −2.10 | D18 = 0.13 | N10 = 1.80518 | ν10 = 25.4 |
| R19 = −35.02 | D19 = 0.01 | | |
| R20 = 2.33 | D20 = 0.53 | N11 = 1.58267 | ν11 = 46.4 |
| R21 = −7.16 | D21 = 1.42 | | |
| R22 = −36.12 | D22 = 0.08 | N12 = 1.83400 | ν12 = 37.2 |
| R23 = 1.43 | D23 = 0.14 | | |
| R24 = 6.69 | D24 = 0.24 | N13 = 1.49831 | ν13 = 65.0 |
| R25 = −2.46 | D25 = 0.01 | | |
| R26 = 1.52 | D26 = 0.36 | N14 = 1.56384 | ν14 = 60.7 |
| R27 = −7.33 | D27 = 0.42 | | |
| R28 = ∞ | D28 = 0.34 | N15 = 1.51633 | ν15 = 64.1 |
| R29 = ∞ | | | |
| f | 1.00 | 2.76 | 7.60 |
| D5 | 0.11 | 1.59 | 2.39 |
| D10 | 2.46 | 0.59 | 0.37 |
| D12 | 0.28 | 0.67 | 0.08 |

TABLE 1

| | Conditions | Numerical Examples | | | | |
|---|---|---|---|---|---|---|
| | | 1 | 2 | 3 | 4 | 5 |
| (a) | f4/L | 1.10 | 1.10 | 1.09 | 1.12 | 1.09 |
| (1) | (N1,2 + N1,3)/2 | 1.65 | 1.65 | 1.65 | 1.65 | 1.65 |
| (2) | \|f2/fw\| | 1.034 | 1.017 | 1.017 | 1.017 | 1.017 |
| (3) | R2,2/fw | 1.25 | 1.24 | 1.27 | 1.27 | 1.28 |
| (4) | \|R2,2/R2,3\| | 0.82 | 0.82 | 0.83 | 0.82 | 0.83 |
| (5) | \|R5,4/fw\| | 36.6 | 29.3 | 31.9 | 31.6 | 35.0 |
| (6) | fw/R5,7 | 0.003 | −0.017 | −0.039 | 0.032 | −0.028 |
| (7) | (N5,2 + N5,4)/2 | 1.82 | 1.82 | 1.82 | 1.82 | 1.82 |
| (8) | R5,1/R5,3 | −1.39 | −1.39 | −1.35 | −1.85 | −1.87 |

TABLE 1-continued

| | Conditions | Numerical Examples | | | | |
|---|---|---|---|---|---|---|
| | | 1 | 2 | 3 | 4 | 5 |
| (9) | R5,5/fw | 2.50 | 2.55 | 2.56 | 2.42 | 2.34 |
| (10) | R5,8/fw | 1.44 | 1.44 | 1.46 | 1.44 | 1.43 |
| (11) | R5,9/R5,11 | 4.25 | 4.17 | 4.27 | 3.83 | 4.40 |
| (12) | D5,2/fw | 0.16 | 0.17 | 0.23 | 0.15 | 0.16 |
| (13) | D5,6/fw | 1.40 | 1.45 | 1.37 | 1.44 | 1.42 |
| (14) | D5,8/fw | 0.12 | 0.12 | 0.14 | 0.14 | 0.14 |

What is claimed is:

1. A zoom lens comprising:
from front to rear,
a first lens unit having a positive refractive power;
a second lens unit for variation of the image magnification having a negative refractive power;
a third lens unit for compensating for the shift of an image plane resulting from the variation of the image magnification;
a fourth lens unit;
a fifth lens unit having a positive refractive power and having an image forming function,
wherein the following condition is satisfied:

$$1.05 < f_4/L < 1.3$$

where L is the absolute value of a distance from a point of convergence of an on-axial light beam which has passed said first lens unit through said third lens unit to a front principal point of said fourth lens unit, and $f_4$ is a focal length of said fourth lens unit.

2. A zoom lens according to claim 1, further comprising an aperture stop positioned in between said fourth lens unit and said fifth lens unit.

3. A zoom lens according to claim 1, wherein said fifth lens unit includes, from front to rear, a first bi-convex lens, a second lens having a negative refractive power and having a concave surface facing the object side, a third bi-convex lens having a refracting surface of stronger curvature facing the object side, a fourth lens having a negative refractive power and having a concave surface facing the image plane side, a fifth bi-convex lens having a refracting surface of stronger curvature facing the image plane side, and a sixth bi-convex lens having a refracting surface of stronger curvature facing the object side.

4. A zoom lens according to claim 3, wherein
said first lens unit includes a first meniscus lens having a negative refractive power and having a convex surface facing the object side, a second bi-convex lens, and a third meniscus lens having a positive refractive power and having a convex surface facing the object side,
said second lens unit includes a first lens having a negative refractive power, a second bi-concave lens, and a third lens having a positive refractive power, said second lens and said third lens being cemented together, and
the following conditions are satisfied:

$$1.57 < N1,2+N1,3/2$$

$$0.96 < |f2/fw| < 1.09, f2 < 0$$

$$1.18 < R2,2/fw < 1.35$$

$$0.77 < |R2,2/R2,3| < 0.87$$

where $N_{i,j}$ is the refractive index of a medium of the j-th lens in the i-th lens unit, $R_{i,j}$ is the radius of curvature of the j-th lens surface in the i-th lens unit, and $f_w$ is the shortest focal length of the entire lens system.

5. A zoom lens according to claim 3, satisfying the following conditions:

$$27.8 < |R5,4/fw| < 38.5$$

$$-0.041 < fw/R5,7 < 0.034$$

$$1.73 < N5,2 + N5,4/2$$

where $N_{i,j}$ is the refractive index of a medium of the j-th lens in the i-th lens unit, $R_{i,j}$ is the radius of curvature of the j-th lens in the i-th lens unit, and $f_w$ is the shortest focal length of the entire lens system.

6. A zoom lens according to claim 5, satisfying the following condition:

$$-1.97 < R5,1/R5,3 < -1.28$$

$$2.22 < R5,5/fw < 2.69$$

$$1.35 < R5,8/fw < 1.55$$

$$3.36 < R5,9/R5,11 < 4.62$$

$$0.15 < D5,2/fw < 0.24$$

$$1.28 < D5,6/fw < 1.53$$

$$0.11 < D5,8/fw < 0.15$$

where $D_{i,j}$ is the j-th lens thickness or air separation in the i-th lens unit.

7. A zoom lens unit according to claim 2, further comprising filter means disposed adjacent to said aperture stop.

* * * * *

UNITED STATES PATENT AND TRADEMARK OFFICE
CERTIFICATE OF CORRECTION

PATENT NO. : 4,892,397  
DATED : January 9, 1990  
INVENTOR(S) : Akihisa Horiuchi Page 1 of 2

It is certified that error appears in the above-identified patent and that said Letters Patent is hereby corrected as shown below:

COLUMN 1:

Line 13, "lage" should read --large--.

COLUMN 1:

Line 65, "fulfills" should read --that fulfills--.

COLUMN 2:

Line 20, "obtain" should read --be obtained--.

Line 66, "monotonously" should read --linearly--.

COLUMN 3:

Line 9, "insserted" should read --inserted--.

Line 45, "picku" should read --pickup--.

COLUMN 4:

Line 45, "concerns" should read --concern--.

COLUMN 6:

Line 11, "$3.36 < R_5,9/R_{5,11} < 4.62$ (11)" should read --$3.36 < R_{5,9}/R_{5,11} < 4.62$ (11)--.

UNITED STATES PATENT AND TRADEMARK OFFICE
CERTIFICATE OF CORRECTION

PATENT NO. : 4,892,397  Page 2 of 2
DATED : January 9, 1990
INVENTOR(S) : Akihisa Horiuchi It is certified that error appears in the above-identified patent and that said Letters Patent is hereby corrected as shown below:

COLUMN 7:

Line 2, "lower limit" should read --upper limit--.

Signed and Sealed this

Third Day of December, 1991

*Attest:*

HARRY F. MANBECK, JR.

*Attesting Officer*   *Commissioner of Patents and Trademarks*